United States Patent [19]

Hughes

[11] 3,989,060

[45] Nov. 2, 1976

[54] GAS PRESSURE REGULATOR

[75] Inventor: George C. Hughes, Anderson, Ind.

[73] Assignee: Textron, Inc., Providence, R.I.

[22] Filed: May 29, 1975

[21] Appl. No.: 581,782

[52] U.S. Cl. .................. 137/484.2; 137/505.46; 137/630.22
[51] Int. Cl.² ................................. F16K 17/34
[58] Field of Search ........ 137/456, 464, 466, 116.5, 137/458, 461, 505.46, 495, 630.22, 484.2, 454.2

[56] References Cited
UNITED STATES PATENTS

| | | | |
|---|---|---|---|
| 2,122,987 | 7/1938 | McElwaine | 137/505.47 X |
| 2,669,071 | 2/1954 | St. Clair | 137/505.46 |
| 2,888,949 | 6/1959 | Evans | 137/505.25 |
| 3,207,175 | 9/1965 | Pauly | 137/116.5 X |
| 3,407,841 | 10/1968 | Semon | 137/505.25 X |
| 3,488,685 | 1/1970 | Hughes | 137/505.46 X |

Primary Examiner—Harold W. Weakley
Attorney, Agent, or Firm—Arthur A. Johnson

[57] ABSTRACT

There is disclosed a gas pressure regulator having valving means comprising an orifice sleeve slidably mounted in a bushing which is located in an aperture in a dividing wall in the regulator casing located between the inlet and outlet means of the regulator, for movement toward and from a stationary upstream valve seat carried by the bushing to regulate the flow of fuel gas from the inlet through the regulator to the outlet thereof. To monitor the flow of gas through the meter the bushing has a valve seat adapted to be engaged by a valve operated by a valve stem to control the pressure of the gas at the outlet of the regulator and to shut off the flow of gas into the diaphragm chamber when the pressure of the gas exceeds a predetermined value and the regulating valve for some cause fails to stop the flow of gas. The bushing with the pressure regulating valve seat thereon and the orifice sleeve may be conveniently inserted into the passage in the dividing wall in the regulator as a unit, the bushing being slidable into the passage through the dividing wall between the inlet and outlet means of the valve housing and may be secured thereto by a single screw threaded into a portion of the valve housing. The valve stem makes abutting engagement with the orifice sleeve and thus avoids the necessity of securing the valve stem to the orifice sleeve when assembling the regulator. The downstream end of the bushing is provided with a segmental lip which acts as a loading ring to produce boost in the regulator. The circumference of the portion of the sleeve engaging an obturating ring carried by the bushing and of an upstream orifice of the orifice sleeve are substantially equal and provision is made so that the pressure of the gas opposing the downstream movement of the orifice sleeve is the same as that opposing the upstream movement of the orifice sleeve so that the orifice sleeve is balanced and the pressure of the gas in the usual piping between the regulator and the connected gas appliances is substantially uniform regardless of variations in the rate of flow of the gas within practical limits.

7 Claims, 9 Drawing Figures

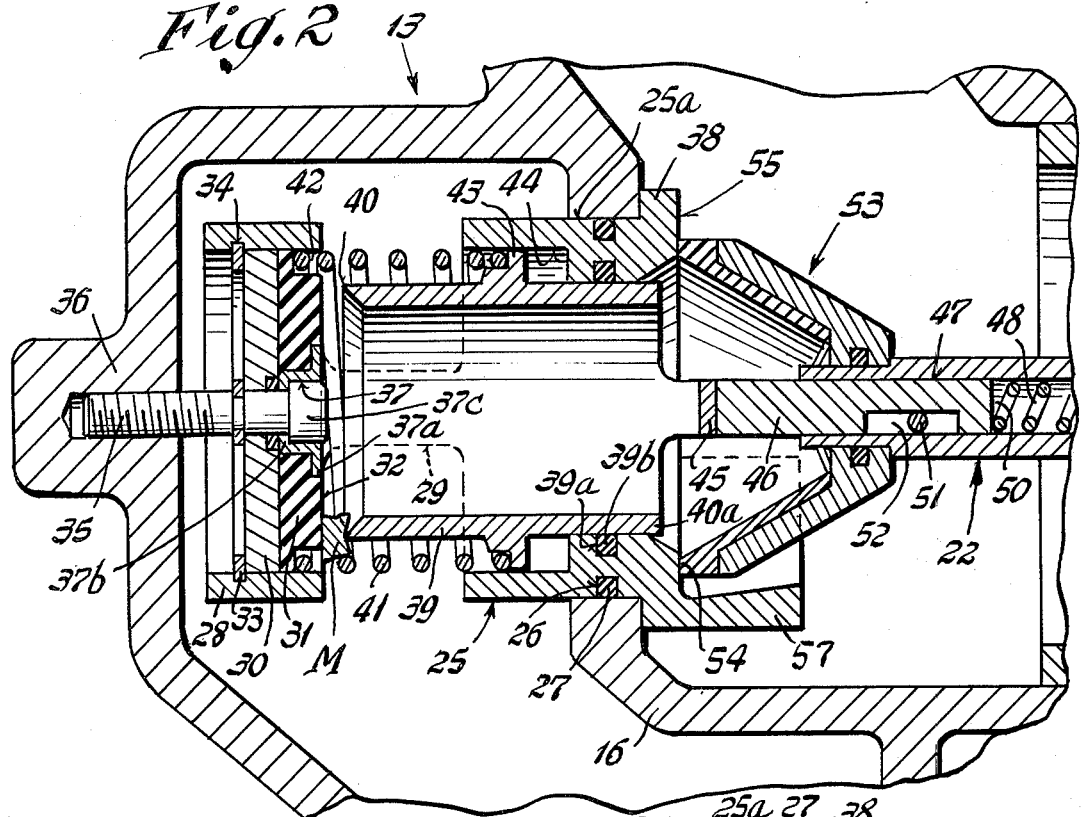
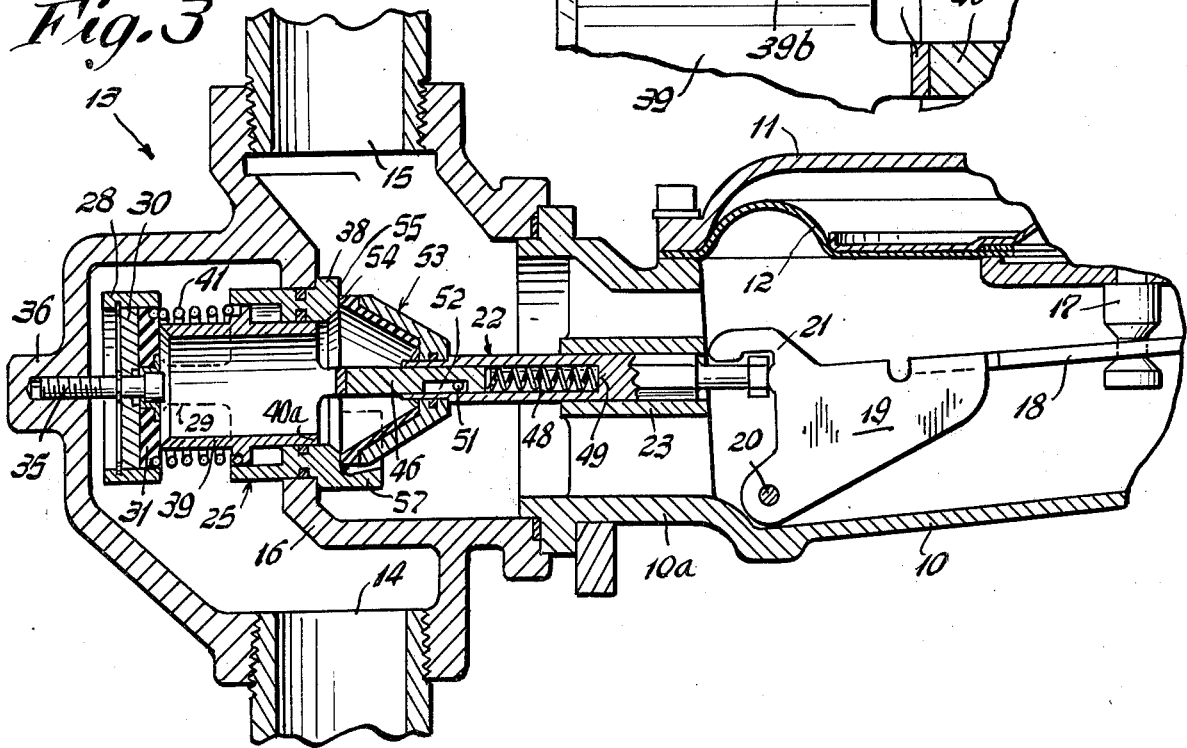

GAS PRESSURE REGULATOR

This invention relates to a pressure regulator for gas and particularly to valving means between the inlet and outlet ports of the regulator.

An object of this invention is to provide an improved gas regulator in which the regulating valve mechanism can be inserted in the valve housing of the regulator as a unit by sliding it through an opening in the dividing wall between the inlet and outlet of the valve housing.

A feature of the present invention is the provision of means whereby it is not necessary that the valve stem which is actuated by the diaphragm be attached to the valve mechanism which is mounted in the dividing wall which operation would be inconvenient. This is accomplished by making an abutting engagement between the valve stem and the valve mechanism and providing spring means constantly urging the valve mechanism against the valve stem.

Another feature is the provision of a bushing in the dividing wall, between the inlet and outlet of the regulator, which has an upstream pressure regulating valve seat and a downstream monitoring valve seat with valve means which respectively engage the upstream valve seat and the downstream valve seat.

Another feature is the provision of a bushing which is longitudinally slidable into an aperture in the dividing wall, as distinguished from being screwed therein, and is secured in operative position by separate screw means engaging a portion of the valve housing. The bushing may be rotatably adjusted on said screw to position a booster lip on the bushing relative to the outlet port of the valve housing to obtain the amount of boost to be provided.

A further feature is the provision of yieldable means between the regulating valve and the diaphragm whereby the monitoring valve may be made to engage the valve seat on the bushing even though movement of the regulating valve is prevented by a particle of foreign matter being lodged between the regulating valve and its valve seat.

Another feature of this invention is the arrangement of the valve means so that the orifices are balanced so that a substantially constant pressure may be maintained over the predetermined range of rates of gas flow for which the regulator is designed.

Another feature is the provision of means by which a flow director adjacent the upstream orifice may be angularly adjusted relative to the outlet of the regulator whereby the degree of boost produced thereby may be varied.

Other features and advantages will hereinafter appear.

In the accompanying drawings:

FIG. 2 is a sectional view on an enlarged scale of the valve mechanism showing the positions of the parts when a particle of foreign material is interposed between the regulating valve seat and the regulating valve of the orifice sleeve, the flow of gas being shut off by the engagement of the monitoring valve with the monitoring valve seat.

FIG. 2a is an enlarged view of the bushing and orifice sleeve in normal operating position shown in FIG. 4.

FIG. 3 is a sectional view of a portion of the regulator of the present invention showing the parts in the positions they occupy when the flow of gas is shut off by the regulating valve while the monitoring valve is in shut-off position to which it moved when the pressure of the gas in the regulator for any reason continued to increase.

Figure 1:
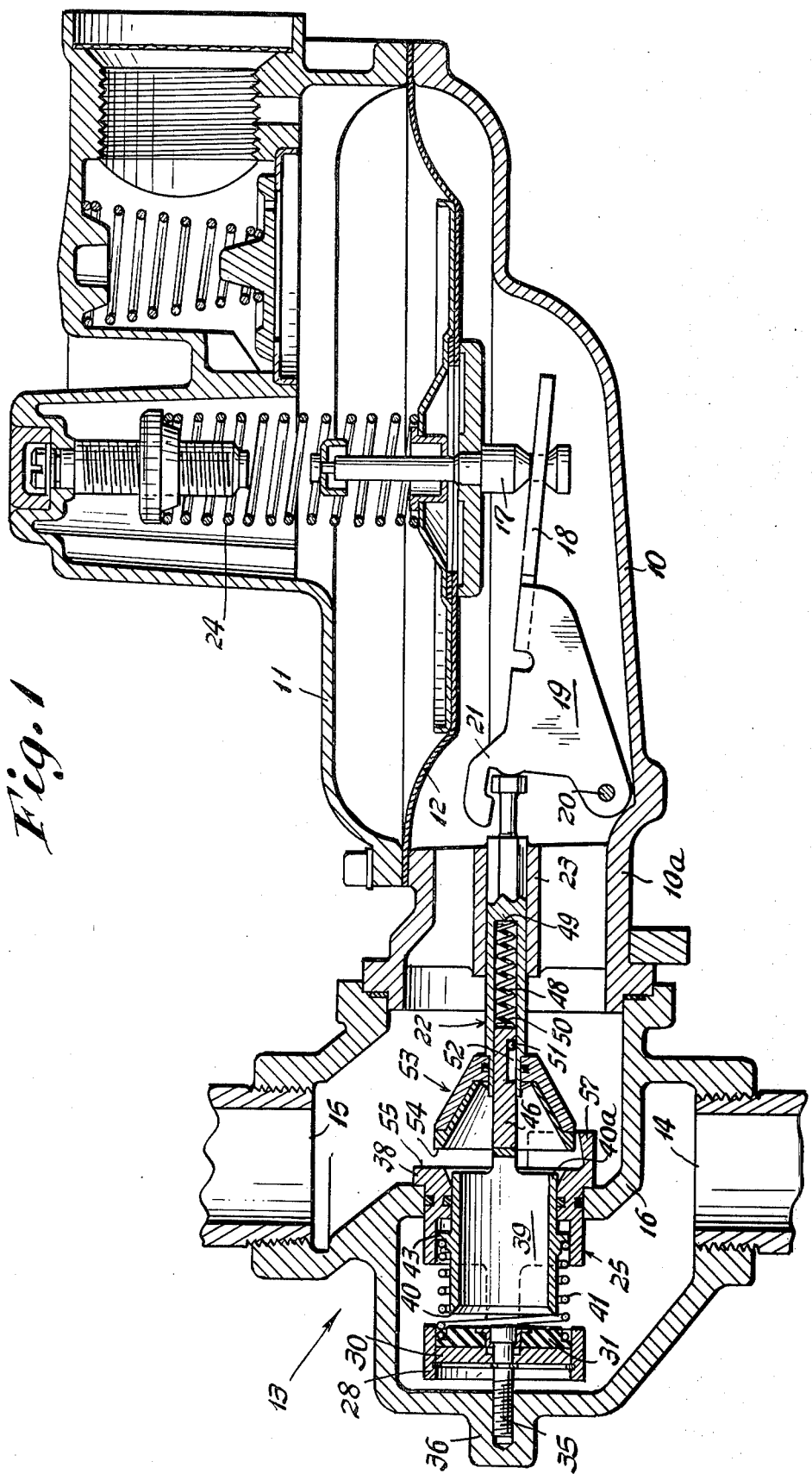
FIG. 1 is a side view of a gas pressure regulator shown in section and showing the valving mechanism of the present invention in normal operating position.

The regulator shown in the accompanying drawing by way of example comprises a diaphragm case 10 and a cover portion 11 between which is clamped a flexible diaphragm 12. A valve housing 13 is secured to the neck portion 10a of the diaphragm case 10 and has an inlet 14 and an outlet 15 separated by a dividing wall 16.

Figure 4:
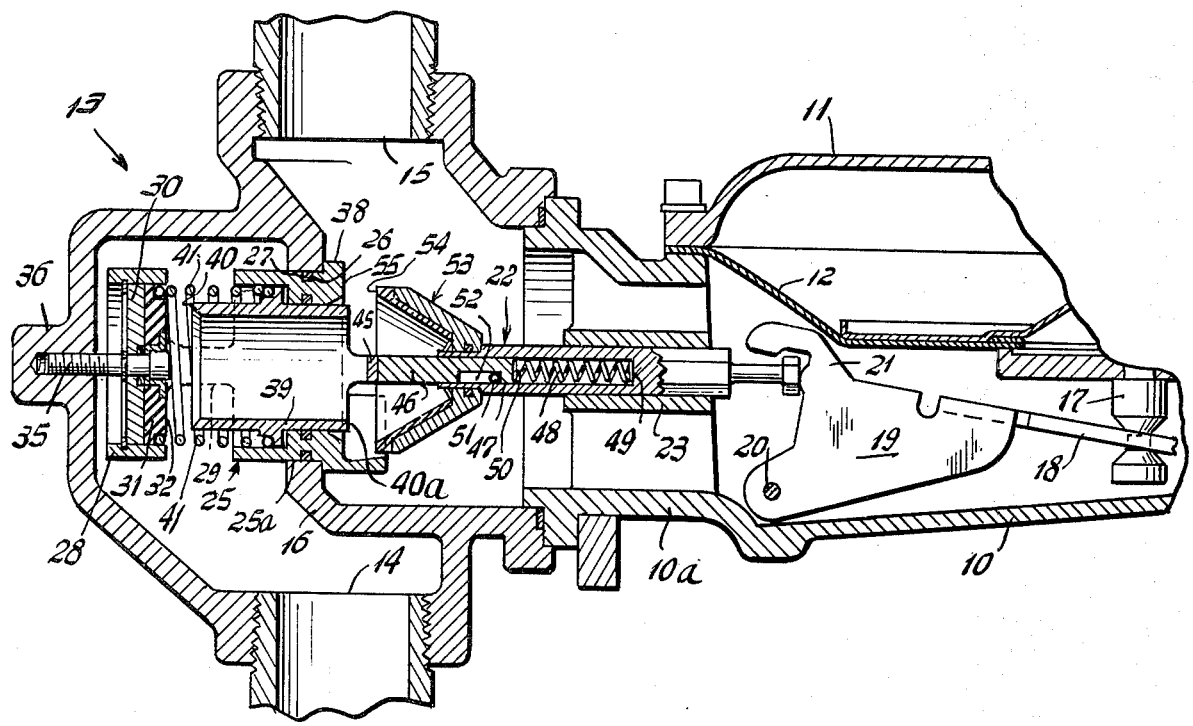
FIG. 4 is a sectional view similar to FIG. 3 but shows the parts in the positions they occupy when the pressure of the gas in the diaphragm chamber falls below a predetermined low pressure.

The diaphragm 12 is connected to a post 17, FIGS. 1, 3 and 4, positioned to engage an arm 18 of a bell crank lever 19 pivoted at 20 and having an arm 21 positioned to engage and operate a valve stem 22 slidably mounted in a bearing 23 in the neck portion 10a under the force applied to the diaphragm 12 by a diaphragm spring 24 which is tensioned to yield more or less from a set condition depending on the pressure of the gas flowing at the time through the regulator.

According to the present invention the valve mechanism comprises a bushing 25 which extends through and is slidably mounted in a hole 25a in the dividing wall 16. The bushing 25 has an external annular groove 26 containing an O-ring 27 or the like obturating means to make a gas-tight slidable connection between the inner surface of the hole 25a in the wall. The bushing 25 has an annulus 28 connected to it but diametrically opposite tie bars 29. Preferably, the bushing 25, annulus 28 and tie bars 29 are formed by investment casting as an integral piece.

Within the annulus 28 there is a backing disk 30 which is engaged by a disk 31 of resilient material forming a valve seat 32. The backing disk 30 is held in the annulus 28 by a snap ring 33 located in an internal annular groove 34 in the annulus 28.

The bushing 25 and its annulus 28, in the form shown herein, are secured in the valve housing 13 by a single axial screw 35 which is threaded in a portion 36 of the valve housing 13. The screw 35 extends through a flanged metal cup 37, see FIG. 2, which has a flange 37a which engages valve seat 32 and portion 37b which engages a washer 30a engaging the backing disk 30 with the head 37c of a screw 35 located in the cup 37. The screw may be conveniently adjusted by passing a tool through the bushing. When the screw 35 is tightened, the bushing 25 is drawn into the valve housing 13 until the flange 38 on the bushing engages the outer edge of the hole 25a through which the bushing extends.

Slidably mounted in the bushing 25 is an orifice sleeve 39 having on its inner or upstream end a chisel-shaped orifice 40 positioned to engage the fixed valve seat 32 referred to above. The orifice sleeve 39 is normally yieldingly held spaced from the valve seat 32 by a spring 41, one end of which rests in a recess 42 in the valve seat 32 and the other end of which engages a flange 43 on the orifice sleeve. The flange 43 is located in a circular recess 44 in the bushing 25. The bushing 25 has an internal annular groove 39a, see FIG. 2, containing an O-ring 39b or other obturating means which provides a gas-tight slidable connection between the bushing and the orifice sleeve 39.

Figure 5:
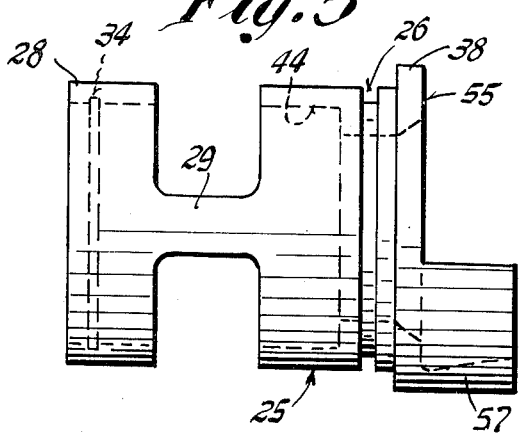
FIG. 5 is an elevation of the bushing which is secured to the dividing wall in the valve housing and in which an orifice sleeve is slidably mounted.
Figure 6:
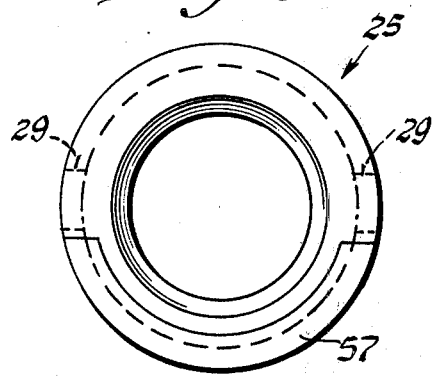
FIG. 6 is an end view of the bushing shown in FIG. 5.
Figure 7:
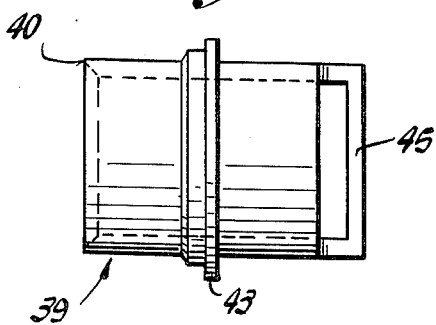
FIG. 7 is an elevation of the orifice sleeve.
Figure 8:
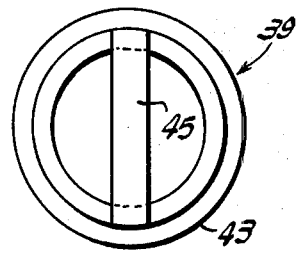
FIG. 8 is an end view of the orifice sleeve shown in FIG. 7.

The orifice sleeve 39 is moved in response to the movement of the diaphragm 12 by means of the valve stem 22 to regulate the flow of gas from the inlet 14 to the outlet 15 and into the diaphragm chamber 10. For this purpose the orifice sleeve 39 is provided with a crossbar 45 (see FIG. 5) positioned to be engaged by end of an interponent 46 slidably mounted in the bore 47 in the end of the valve stem 22. Within the bore 47 there is a spring 48, one end of which engages the end 49 of the bore 47, while the other end 50 engages the interponent 46.

The interponent 46 is coupled to the valve stem 22 by a lost motion device comprising a pin 51 fixed in the valve stem and positioned to ride in an elongate slot 52 in the interponent 46. The spring 48 normally engages the end of the interponent with the pin 51 at the end of the slot 52 so that normally the orifice sleeve 39 moves toward and from the valve seat 32 as a unit by the force applied to the end of the interponent by the spring 48 to regulate the pressure of the gas at the outlet 15 as the diaphragm rises and falls with the changing of the pressure of the gas in the regulator.

When the pressure of the gas in the regulator (and of course in the system to which the regulator is connected) increases, causing the diaphragm to rise and the valve stem to move toward the valve housing 13, the valve stem 22, spring 48, interponent 46 and orifice sleeve 39 will be moved to the left, as shown in FIG. 3, causing the orifice 40 in the sleeve 39 to move closer to the valve seat 32 and thus restore a normal flow of gas through the regulator.

This movement of the orifice sleeve 39 causes the spring 41 to be compressed. Hence, when the pressure of the gas is reduced to optimum pressure, the spring 41 bearing on the stationary valve seat 32 and the flange 43 of the orifice sleeve 39 reverse the direction of movement of the orifice sleeve 39, the interponent 46, spring 48 and valve stem 22 in response to the change in position of the diaphragm 12.

It sometimes occurs that a piece of foreign matter M becomes lodged between the orifice 40 and the valve seat 32, as shown in FIG. 2, which would prevent the proper regulation of the gas pressure and serious damage may occur if the malfunction continues.

To avoid this difficulty, the present invention provides a monitoring valve body 53 which is rigidly secured to the valve stem 22 to move therewith. The edge of the monitoring valve body 53 is provided with a valve 54 of resilient material positioned to engage the face 55 of the flange 38 of the bushing 25 if the closing of the orifice sleeve 39 is prevented by any means. Such independent movement of the orifice sleeve 39 and the monitoring valve body 53 is provided for by the slot 52 in the interponent 46 in which the pin 51 may ride against the force of the spring 48 in the valve stem 22, causing valve 54 on the body 53 to be forced against the face 55 of the flange 43 of the bushing.

When the pressure of the gas in the regulator normally increases causing movement of the valve stem 22, the spring 48 does not yield, but pushes the interponent 46 outwardly of the stem 22 causing the end 50 of the interponent to apply pressure to the crossbar 45 of the orifice sleeve 39 and force the latter toward the fixed valve seat 32, thus reducing the pressure of the gas at the outlet 15.

When the pressure of the gas in the regulator decreases beyond a normal value, the valve stem 22 retracts and the spring 41 acting on the flange 43 of the orifice sleeve 39 causes the orifice 40 to move away from the valve seat 32 and allows a greater flow of gas into the outlet 14 and the diaphragm chamber 10a.

In the event that the movement of the sleeve 39 is prevented, for instance, by a foreign material M being interposed between the orifice 40 and the valve seat 32, from moving to a proper position in relation to the valve seat 32, the movement of the valve stem 22 will continue causing the cup-shaped valve body 53 carried by the valve stem 22 to advance toward the bushing 25. When this occurs, a resilient valve portion 54 of the body 53 engages the face 55 of the flange 43 on the bushing 25 and stops the flow of gas to the diaphragm chamber.

In order to maintain substantially constant pressure of the gas passing through the regulator over a predetermined range of rates of gas flow for which the regulator is designed, the upstream orifice 40 and downstream orifice 40a of the orifice tube have substantially the same diameter, and the orifice sleeve 36 provided with the peripheral flange 43 located in the recess 44 of the bushing is subject to the same gas pressure on its upstream side and its downstream side as the gas passing between the edge of the flange 43 and the surface of the recess 44.

Heretofore, it has been proposed to provide on the downstream side of the valving mechanism a gas director to deflect the portion of the gas stream issuing from the downstream side of the orifice whereby the main stream of gas issuing from the orifice is not directed to the underside of the diaphragm, but instead is directed more or less to the outlet of the regulator.

For instance, in U.S. Pat. No. 2,315,370 the gas streams or eddy currents are directed toward the outlet part by a director plate carried by the valve seat. In U.S. Pat. No. 3,754,570 the eddy currents are controlled by cavitating the valve seat. For this purpose the valve seat body 53 of the present invention is provided with a conical cavity facing the downstream orifice 40a against which the gas streams impinge and are turned back toward the orifice where they would escape radially. However, to direct such escaping currents toward the outlet of the regulator, the downstream side of the bushing 25 is provided with a deflector flange 57 which is segmental and extends over about 80° each side of the vertical. If it is desired to make the flow greater on one side of the vertical, the screw 35 may be loosened and the bushing rotated in one direction or the other after which the screw may be tightened.

Variations and modifications may be made within the scope of the claims and portions of the improvements may be used without others.

I claim:

1. A gas pressure regulator comprising a diaphragm case; a valve housing having an inlet, an outlet and a dividing wall between said inlet and said outlet, said wall having a passage therethrough; a diaphragm in the diaphragm case responsive to the pressure of the gas in the regulator; and valving means controlled by said diaphragm to regulate the flow of gas through said passage, the improvement wherein there is fixed in said dividing wall a bushing which extends through said passage from said inlet to said outlet in gas-tight engagement with said wall, said valving means comprising an orifice sleeve slidably mounted in said bushing in gas-tight engagement with the interior of the bushing and having an upstream orifice forming a valve; a pressure regulating valve seat carried by said bushing and positioned to cooperate with said upstream orifice of said orifice sleeve; a valve seat on the downstream end of said bushing; and monitoring valve means operated by said diaphragm, when the gas pressure in said diaphragm case exceeds an acceptable limit, to engaged said valve seat on the bushing and shut off the flow of gas through said orifice sleeve and into said diaphragm case, said means for operating said monitoring valve including a rod slidably mounted on said diaphragm case and operatively connected to said diaphragm to be operated thereby.

2. The invention as defined in claim 1 in which said rod has an axial cavity and there are means for operating said regulating valve comprising an interponent slidably mounted in said cavity and positioned to engage said regulating valve, spring means in said cavity between the bottom of the cavity and said interponent to cause the rod when moved to move said interponent and said regulating valve toward said regulating valve seat, and lost-motion means between said rod and said interponent whereby said rod may continue to travel to cause said monitoring valve seat to engage said valve on the bushing when the orifice sleeve is obstructed from operating to close said regulating valve.

3. The invention as defined in claim 2 in which said lost-motion means between said spring means and said rod comprises a pin and slot connection between said rod and said interponent.

4. The invention as defined in claim 1 in which said bushing has a cylindrical cavity and said orifice sleeve has a peripheral flange extending into said cavity and resilient means engaging said flange to urge said upstream orifice of said orifice sleeve away from said upstream valve of said bushing.

5. The invention as defined in claim 4 in which the peripheral edge of said flange is spaced from the interior surface of said cylindrical cavity whereby pressure of the gas against the inner surface of the flange and the pressure against the outer surface of said flange are equal whereby the orifice sleeve is balanced and substantially unaffected by variations of the pressure of the incoming gas except that produced by the pressure of the gas on the diaphragm.

6. The invention as defined in claim 1 in which the bushing is slidably mounted in said wall and there are means for securing the bushing in place in said wall comprising a single screw passing through the axis of the bushing on which the bushing may be arcuately adjusted.

7. The invention as defined in claim 6 in which the bushing has a downstream segmental deflector flange adjacent its downstream orifice and adjustable arcuately with said bushing to vary the loading effect of said loading flange.

* * * * *